(12) United States Patent
Chiu et al.

(10) Patent No.: US 10,118,253 B2
(45) Date of Patent: Nov. 6, 2018

(54) METHOD FOR MANUFACTURING LIGHT SOURCE ASSEMBLY

(71) Applicant: Radiant Opto-Electronics Corporation, Kaohsiung (TW)

(72) Inventors: Yi-Jen Chiu, Kaohsiung (TW); Jung-Yin Chang, Kaohsiung (TW)

(73) Assignee: Radiant Opto-Electronics Corporation, Kaohsiung (TW)

(*) Notice: Subject to any disclaimer, the term of this patent is extended or adjusted under 35 U.S.C. 154(b) by 914 days.

(21) Appl. No.: 14/467,044

(22) Filed: Aug. 24, 2014

(65) Prior Publication Data

US 2015/0292689 A1 Oct. 15, 2015

(30) Foreign Application Priority Data

Apr. 15, 2014 (TW) .............................. 103113717 A

(51) Int. Cl.
 B23K 26/20 (2014.01)
 F21V 8/00 (2006.01)
(52) U.S. Cl.
 CPC .............. B23K 26/20 (2013.01); G02B 6/009 (2013.01)
(58) Field of Classification Search
 CPC ................................ B23K 26/20; G02B 6/009
 USPC ...................... 362/217.17; 156/272.8, 309.6; 219/121.6, 121.62, 121.63
 See application file for complete search history.

(56) References Cited

U.S. PATENT DOCUMENTS

| | | | | |
|---|---|---|---|---|
| 4,634,832 A | * | 1/1987 | Martyr | B23K 26/0643 219/121.63 |
| 5,595,670 A | * | 1/1997 | Mombo-Caristan | B23K 15/006 219/121.14 |
| 5,603,853 A | * | 2/1997 | Mombo-Caristan | B23K 15/006 219/121.14 |
| 5,902,498 A | * | 5/1999 | Mistry | B01J 2/00 219/121.64 |
| 8,475,031 B1 | * | 7/2013 | Chen | G02B 6/0083 362/600 |
| 9,555,580 B1 | * | 1/2017 | Dykstra | B29C 65/0672 |
| 2008/0254242 A1 | * | 10/2008 | Asada | B29C 66/542 428/34 |
| 2008/0286532 A1 | * | 11/2008 | Ando | B29C 65/1635 428/172 |
| 2009/0258233 A1 | * | 10/2009 | Bolser | B29C 65/1616 428/412 |

(Continued)

FOREIGN PATENT DOCUMENTS

CN 202065761 U 12/2011
EP 0896898 A2 2/1999

(Continued)

*Primary Examiner* — Tsion Tumebo
(74) *Attorney, Agent, or Firm* — CKC & Partners Co., Ltd.

(57) ABSTRACT

A light source assembly and a method for manufacturing the same are provided. The method for manufacturing the light source assembly includes the following steps. A back plate and a light bar are provided, in which the light bar includes a substrate and plural light emitting diodes disposed on a mounting surface of the substrate. The light bar is disposed on the back plate and a weld-processing area which includes an air interface is formed between the light bar and the back plate. The light bar and/or the back plate are/is melted by welding to form melted materials for filling the weld-processing area to fix the substrate on the back plate.

8 Claims, 5 Drawing Sheets

(56) References Cited

U.S. PATENT DOCUMENTS

2010/0213179 A1* 8/2010 Peters ................ B23K 26/0676
                                                               219/121.64
2011/0318886 A1* 12/2011 Tsao ..................... H05K 3/1208
                                                                438/125
2012/0287373 A1* 11/2012 Tsai ...................... G02B 6/0085
                                                                 349/62

FOREIGN PATENT DOCUMENTS

| TW | 567293 B | 12/2003 |
| TW | 201247747 A1 | 12/2012 |
| TW | 201317491 A1 | 5/2013 |

* cited by examiner

METHOD FOR MANUFACTURING LIGHT SOURCE ASSEMBLY

RELATED APPLICATIONS

This application claims priority to Taiwan Application Serial Number 103113717, filed Apr. 15, 2014, which is herein incorporated by reference.

BACKGROUND

Field of Invention

The present invention relates to a light source assembly. More particularly, the present invention relates to a light source assembly and its fabrication method by welding to fix a light bar on a back plate.

Description of Related Art

Referring to FIG. 1 and FIG. 2, FIG. 1 is a schematic diagram showing a conventional process of welding a light bar 110 on a back plate 130, and FIG. 2 is a schematic structural diagram showing the conventional light bar 110 welded on the back plate 130. In the conventional backlight module, the light bar 110 is directly welded on the back plate 130. Before the welding process is performed, a light bar 110 is directly placed on a back plate 130 to enable a bottom surface 110a of the light bar 110 to be in completely contact with a surface 130a of the back plate 130. Thereafter, the welding process starts from a edge 150 between a back surface 110b of the light bar 110 and the surface 130a of the back plate 130 by using a welding device 190, so as to fix the light bar 110 on the back plate 130.

As shown in FIG. 1, in the welding process, a heat-conducting area A1 of the light bar 110 is quarter-circular, and a heat-conducting area A2 of the back plate 130 is semi-circular, meaning that the heat-conducting paths of the light bar 110 and the back plate 130 have different lengths and ranges, thus resulting in that the thermal stresses exerted on the light bar 110 and the back plate 130 are not uniform. Moreover, during the welding process, a peripheral position around the edge 150 is heated and melted firstly, causing the light bar 110 to be inclined to the back plate 130 (as shown in FIG. 2) instead of being upright thereon, or causing the back plate 130 to have irregular warpages, and thus the difficulty of the welding process is increased, and the welding quality and the whole optical efficiency of the backlight module are affected.

In addition, as shown in FIG. 2, after the welding process is completed, a welding layer 170 is formed between the bottom surface 110a of the light bar 110 and the surface 130a of the back plate 130. One of the major functions of the welding layer 170 is to transfer the heat generated by the light bar 110 to the back plate 130 and further to the ambience. Therefore, the depth D1 of the welding layer 170 can represent a depth of effective heat-conduction range. In other words, a larger depth D1 of the welding layer 170 stands for a larger area of the welding layer 170, and the heat conduction effect is better. However, if the depth D1 is desired to be deeper, the welding process requires much more energy. However, as shown in FIG. 1, during the welding process, the light bar 110 and the back plate 130 will undergo extremely high temperature at first. When the depth D1 is increased during the welding process, the desired energy and temperature is increased accordingly, and thus the damage of the light bar 110 due to too high temperature is likely to be caused.

SUMMARY

One aspect of the present invention is to provide a light source assembly and a method for manufacturing the light source assembly, in which a weld-processing area is formed between a back plate and a light bar to separate the light bar from the back plate. When a laser welding process is performed, a laser beam is reflected back and forth between the back plate and the light bar to melt the light bar and the back plate in the weld-processing area rapidly, such that the melted materials can flow through and fill the weld-processing area to fix the light bar on the back plate. Accordingly, thermal energy of the laser beam can be effectively used to decrease the laser welding power and melt the connecting portions rapidly. In addition, the decreased laser welding power can prevent the light bar from being damaged during the welding process, and the back plate from having irregular warpages.

According to the aforementioned objects, a method for manufacturing a light source assembly is provided. The method for manufacturing the light source assembly includes the following steps. A back plate and a light bar are provided, in which the light bar includes a substrate and plural light emitting diodes disposed on a mounting surface of the substrate. The light bar is disposed on the back plate and a weld-processing area which includes an air interface formed between the light bar and the back plate. The light bar and/or the back plate are/is melted during the welding process, so as to form melted materials for filling the weld-processing area to fix the substrate on the back plate.

According to an embodiment of the present invention, the method for manufacturing the light source assembly further includes forming a welding layer after the melted materials fill the weld-processing area, in which the substrate is fixed on the back plate via the welding layer.

According to an embodiment of the present invention, the method for manufacturing the light source assembly further includes, before the step of disposing the light bar on the back plate, forming at least one connecting portion on a surface of the back plate or a bottom surface of the substrate to separate the light bar from the back plate, thereby forming the weld-processing area.

According to an embodiment of the present invention, the step of forming the at least one connecting portion includes forming the at least one connecting portion through stamping.

According to an embodiment of the present invention, the step of forming the at least one connecting portion includes simultaneously forming at least one recess portion on an opposite surface of the surface of the back plate or an opposite surface of the bottom surface of the substrate, and the at least one recess is corresponding to the at least one connecting portion.

According to an embodiment of the present invention, the step of disposing the light bar on the back plate includes forming an included angle between the substrate and the back plate, and the included angle is smaller than 90 degrees.

According to an embodiment of the present invention, the welding process includes an operation of using a laser device to emit a laser beam to the weld-processing area, and the incident angle of the laser beam is in a range substantially from 12 degrees to 20 degrees.

According to an embodiment of the present invention, a height of the at least one connecting portion is in a range substantially from 0.04 mm to 0.12 mm.

According to an embodiment of the present invention, the mounting surface of the substrate is vertical to a bottom surface of the substrate.

According to the aforementioned objects, a light source assembly is provided. The light source assembly includes a back plate, a light bar and at least one connecting portion.

The light bar is disposed on a surface of the back plate via a welding layer. The connecting portion is located adjacent to the welding layer and between the back plate and the light bar.

According to an embodiment of the present invention, the light bar includes a substrate and plural light emitting diodes disposed on a mounting surface of the substrate.

According to an embodiment of the present invention, the mounting surface of the substrate is vertical to a bottom surface of the substrate.

According to an embodiment of the present invention, the connecting portion is a convex portion protruding from the back plate or from the light bar by stamping.

According to an embodiment of the present invention, the back plate further includes at least one recess portion located on an opposite surface of the surface of the back plate or an opposite surface of the bottom surface of the substrate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
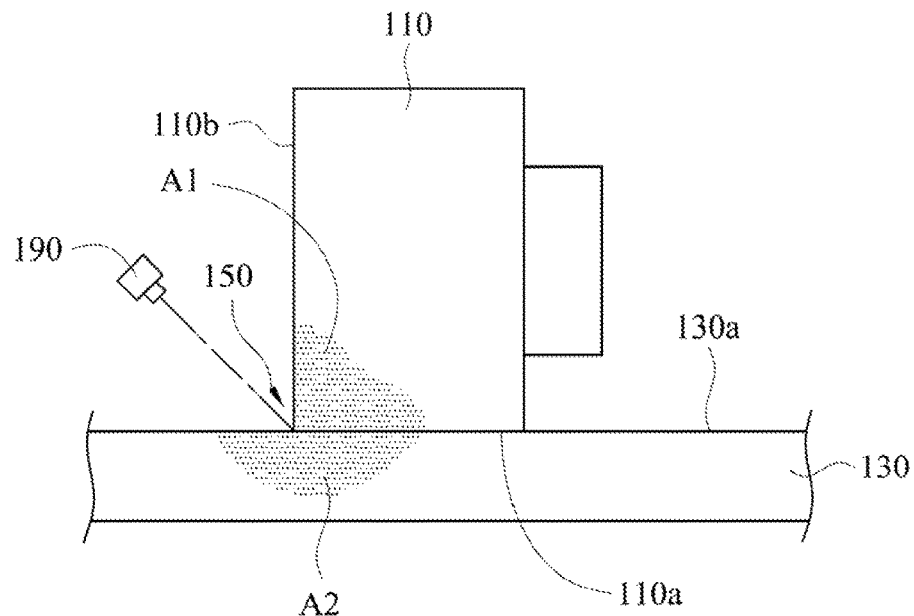
FIG. 1 is a schematic diagram showing a conventional process of welding a light bar on a back plate.
Figure 2:
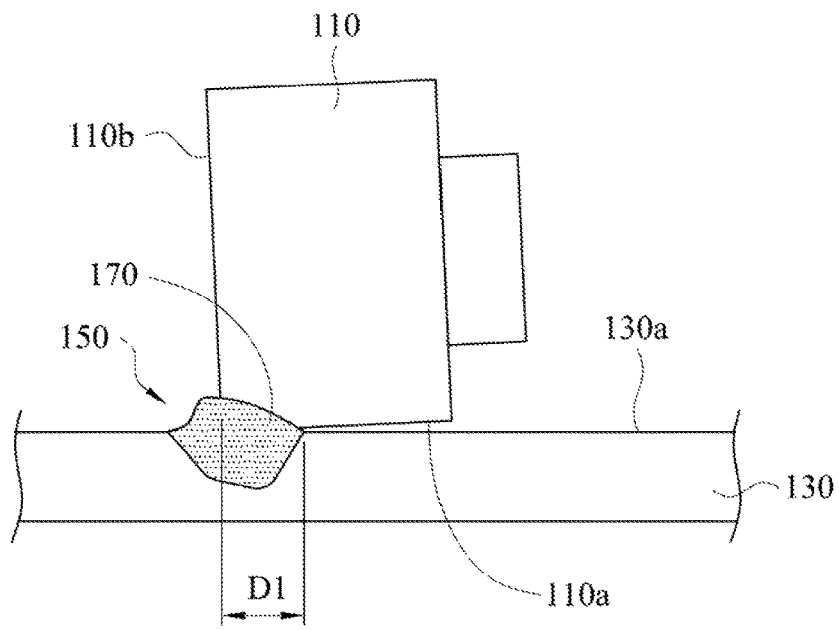
FIG. 2 is a schematic structural diagram shoving a conventional light bar welded on a back plate.

Reference will now be made in detail to the present embodiments of the invention, examples of which are illustrated in the accompanying drawings. Wherever possible, the same reference numbers are used in the drawings and the description to refer to the same or like parts.

Figure 3:
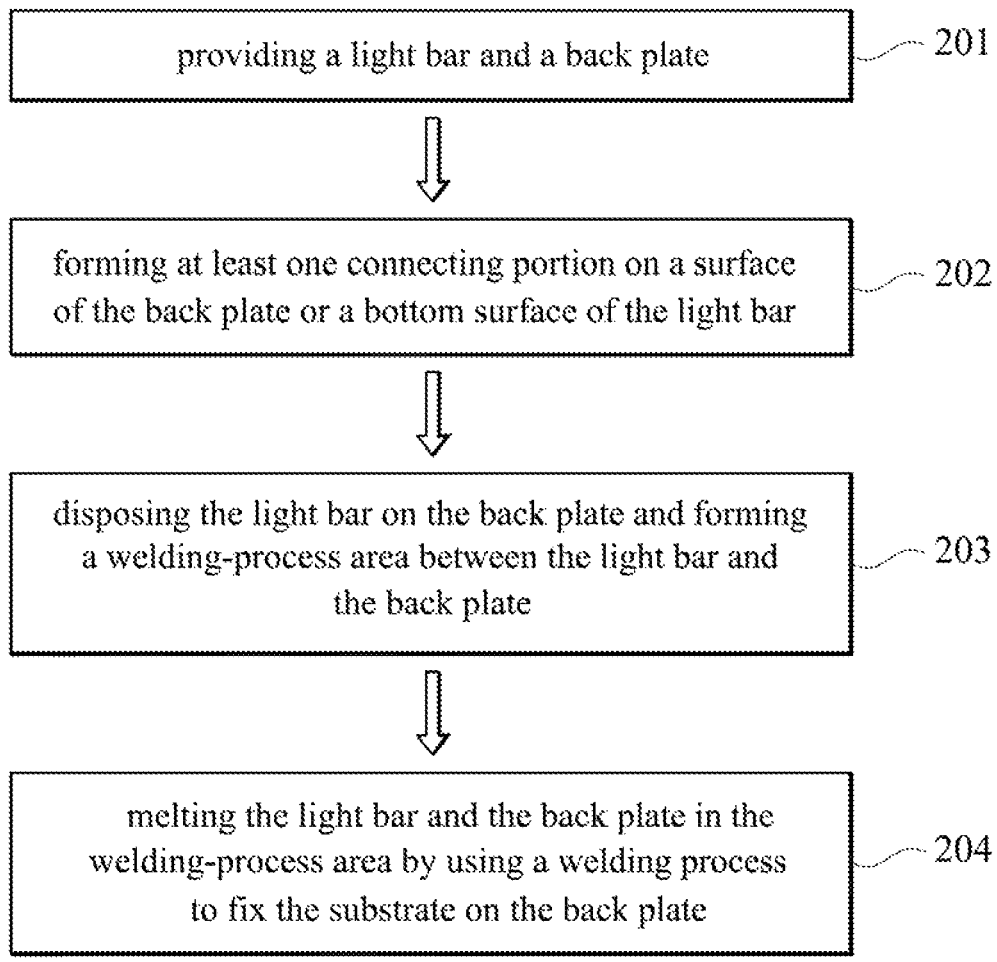
FIG. 3 is a flow chart showing a method for manufacturing a light source assembly in accordance with an embodiment of the present invention.
Figure 4A:
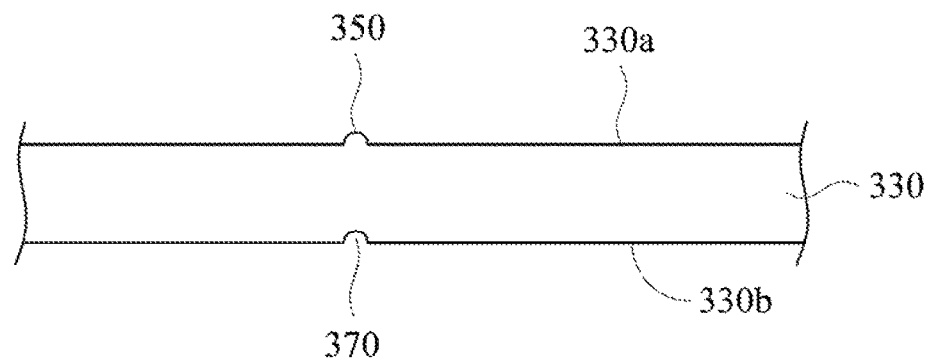
FIG. 4A-FIG. 4C are schematic diagrams of intermediate stages showing a method for manufacturing a light source assembly in accordance with an embodiment of the present invention.
Figure 4B:
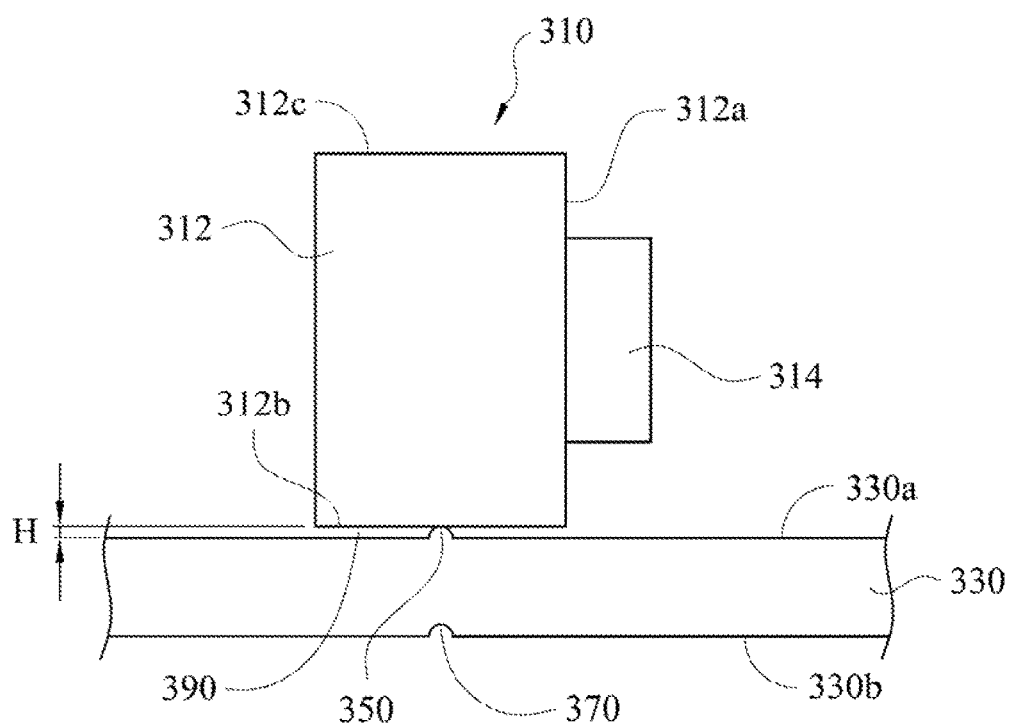
Figure 4C:
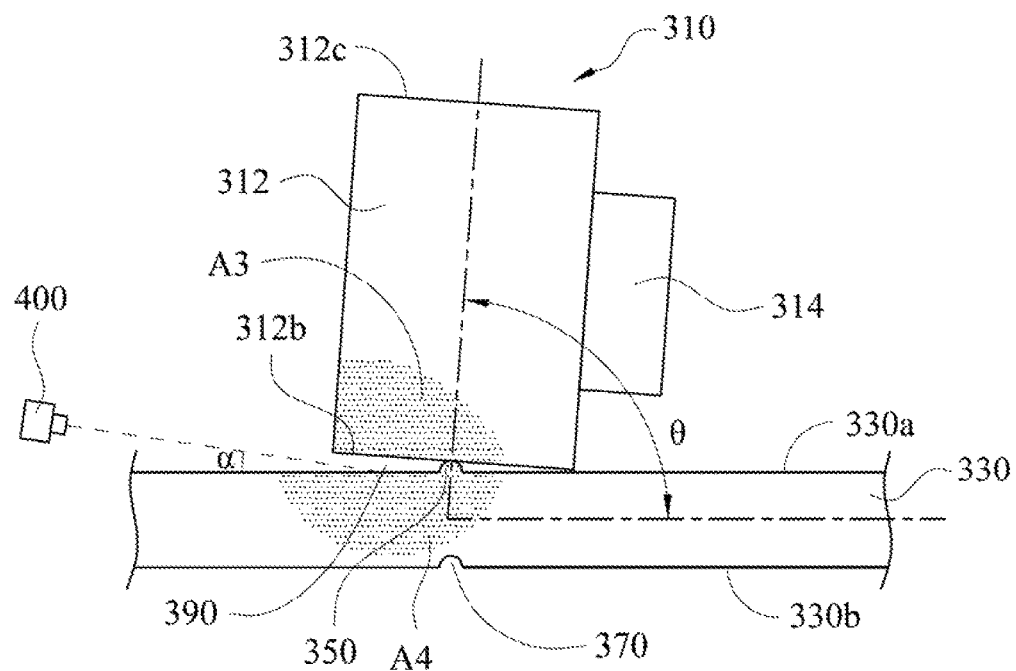

Simultaneously referring to FIG. 3 and FIG. 4A-FIG. 4C, FIG. 3 is a flow chart showing a method 200 for manufacturing a light source assembly in accordance with an embodiment of the present invention, and FIG. 4A-FIG. 4C are schematic diagrams of intermediate stages showing the method 200 for manufacturing the light source assembly in accordance with an embodiment of the present invention. In the method 200, step 201 is performed to provide a light bar 310 and a back plate 330. As shown in FIG. 46, the light bar 310 includes a substrate 312 and plural light-emitting diodes 314. The substrate 312 has a mounting surface 312a, a bottom surface 312b and a top surface 312c. The bottom surface 312b and the top surface 312c are respectively located on the two opposite sides of the substrate 312, and the mounting surface 312a connects the bottom surface 312b and the top surface 312c, i.e. two edges of the mounting surface 312a are respectively connected to the bottom surface 312b and the top surface 312c. In one embodiment, the mounting surface 312a is vertical to the bottom surface 312b. The light-emitting diodes 314 are disposed on the mounting surface 312a of the substrate 312. On the other hand, the back plate 330 has two opposite surfaces 330a and 330b.

Thereafter, step 202 is performed to form at least one connecting portion 350 on the surface 330a of the back plate 330. As shown in FIG. 4A, in the present embodiment, the back plate 330 is made of aluminum, and the connecting portion 350 protruding from the surface 330a is formed by stamping along a direction from the surface 330b of the back plate 330 towards the surface 330a of the back plate 330. While the connecting portion 350 is being formed, at least one recess portion 370 corresponding to the connecting portion 350 is formed on the 330b of the back plate 330 at the same time. In some embodiments, the connecting portion 350 is a protrusive dot, a protrusive block or a protrusive stripe. In one example, when the dimension of the back plate 330 is 700 mm×150 mm×1 mm and the dimension of the light bar 310 is about 700 mm×2.7 mm×2 mm, each of the connecting portion 350 is a protrusive dot with a diameter in a range substantially from 1.48 mm to 1.52 mm and with a height in a range substantially from 0.04 mm to 0.12 mm. Moreover, a distance between every two adjacent connecting portions 350 is in a range substantially from 4.98 mm to 5.02 mm.

It is noted that the connecting portion 350 of the present embodiment is formed on the surface 330a of the back plate 330. In other embodiments, the connecting portion is formed on the bottom surface 312b of the substrate 312. Similarly, a stamping process is also performed along a direction from the top surface 312c of the substrate 312 towards the bottom surface 312b of the substrate 312, so as to form the connecting portions 350 as shown in FIG. 4A. In addition, in the present embodiment, while the connecting portion 350 is being formed, at least one recess portion 370 corresponding to the connecting portion 350 is formed on top surface 312c of the substrate 312 at the same time. In one embodiment, the substrate 312 of the light bar 310 is made of aluminum.

Thereafter, step 203 is performed to place the light bar 310 on the back plate 330 to position the connecting portion 350 between the surface 330a of the back plate 330 and the bottom surface 312b of the substrate 312. In other words, the connecting portion 350 can be used to separate the light bar 310 from the back plate 330 for forming a weld-processing area 390 between the light bar 310 and the back plate 330. In the present embodiment, the weld-processing area 390 includes an air interface but not limited. As shown in FIG. 4B, because the connecting portion 350 has a height H, not all of the bottom surface 312b of the substrate 312 directly contact with the surface 330a of the back plate 330 when the light bar 310 is disposed on the back plate 330, and there is a distance which is referred to as the height H of the connecting portion 350 from the bottom surface 312b of the substrate 312 to the surface 330a of the back plate 330. It is noted that the stamping process for forming the connecting portion 350 is merely used as an example for explanation, and embodiments of the present invention is not limited thereto. In other embodiments, the light bar 310 is separated from the back plate 330 by using pads or other methods, thereby forming the weld-processing area 390 between the light bar 310 and the back plate 330.

After the light bar 310 is disposed on the back plate 330, step 204 is performed to melt portions of the light bar 310 and/or the back plate 330 by welding, so as to fix the substrate 312 on the surface 330a of the back plate 330 by using the melted materials formed from the melted portions of the back plate 330 and the substrate 312 near the connecting portion 350. In the welding process, the melted materials from the melted portions of the back plate 330 and the substrate 312 flows through and fills the weld-processing area 390 to connect the substrate 312 and the back plate 330. In the present embodiment, the welding process is to use a laser device to emit a laser beam to the weld-processing area between the bottom surface 312b of the substrate 312 and the surface 330a of the back plate 330. Meanwhile, the laser beam is reflected back and forth between the bottom surface 312b and the surface 330a, so that the laser beam can be used effectively to melt the light bar 310 and the back plate 330 rapidly and then fix the light bar 310 on the back plate 330. In addition, the design of the connecting portion 350 and the weld-processing area 390 enables the bottom surface 312b of the light bar 310 and the surface 330a of the back plate 330 to be processed by the laser beam directly, and thus the melted materials formed by welding beneath the light bar 310 can be controlled.

As shown in FIG. 4C, in one embodiment, before the welding process is performed, the light bar 310 is inclinedly disposed on the back plate 330 other words, a fixture can be used to form an included angle θ which is less than 90 degrees between the substrate 312 and the back plate 330. After the welding process, the melted portions of the substrate 312 and the back plate 330 are cooled, solidified and shrunk. Therefore, with the inclination of the light bar 310 disposed on the back plate 330, the shrinkage stress generated by the cooling of the melted portions of the substrate 312 and the back plate 330 can enable the substrate 312 of the light bar 310 to be vertical to the back plate 330. In addition, the warping amount of the back plate 330 can be controlled by adjusting the height H of the connecting portion 350 and the included angle θ between the substrate 312 and the back plate 330, thereby increasing, the flatness of the back plate 330 after being welded and promoting the product quality.

Referring to FIG. 4C again, in the welding process, both heat-conducting area A3 of the light bar 310 and a heat-conducting area A4 of the back plate 330 are semi-circular. In other words, when the laser beam 400 is emitted into the space between the bottom surface 312b of the substrate 312 and the surface 330a of the back plate 330, heat generated by the laser beam 400 will be propagated to the bottom surface 312b of the substrate 312 and the surface 330a of the back plate 330 uniformly by using the connecting portion 350 as a center of the heat-conducting area, such that the substrate 312 and the back plate 330 undergo uniform thermal stress, thereby decreasing difficulty of the welding process and increasing quality of the light source assembly.

Referring to FIG. 4C again, in one embodiment, the welding process includes an operation of using the laser device 400 to emit the laser beam at an incident angle α of about 12 degrees to about 20 degrees to the weld-processing area between the bottom surface 312b of the substrate 312 and the surface 330a of the back plate 330. The aforementioned "incident angle α" is referred to as an included angle between an incident direction of the laser beam and the surface 330a of the back plate 330. In one embodiment, the light spot size of the laser beam is about 0.03 mm, and the laser welding power is in a range from about 430 W to about 480 W.

Figure 5:
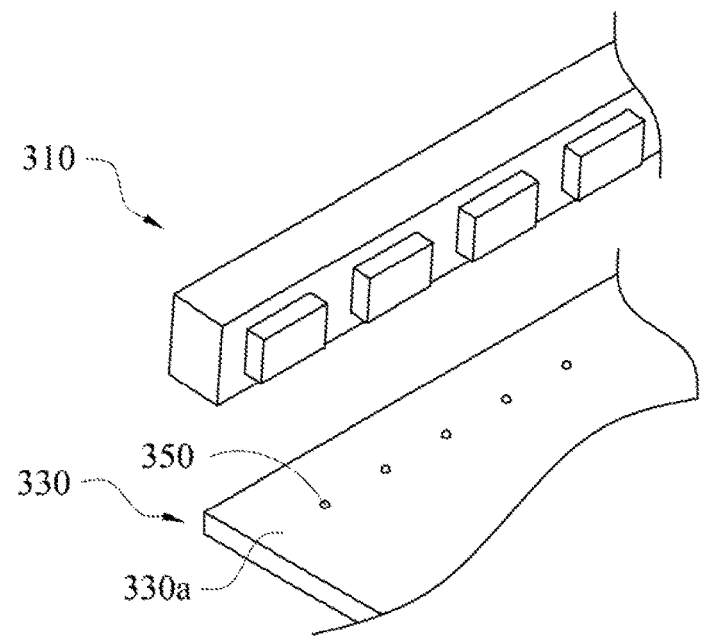
FIG. 5 is a schematic structural diagram showing a light bar and a back plate of a light source assembly in accordance with an embodiment of the present invention.

Referring to FIG. 5, FIG. 5 is a schematic structural diagram showing a light bar and a back plate of a light source assembly in accordance with an embodiment of the present invention. Before the light bar 310 is welded on the back plate 330, the connecting portion 350 has to be formed on the surface 330a of the back plate 330 or the bottom surface 312b of the light bar 310 in advance, so as to separate the light bar 310 from the back plate 330. Therefore, the pre-welding preparation of directly forming or externally adding the connecting portion 350 on the back plate 330 or the light bar 310, or purchasing the back plate 330 or the light bar 310 with the connecting portion 350 from a supplier without departing from the scope of the present invention.

Figure 6:
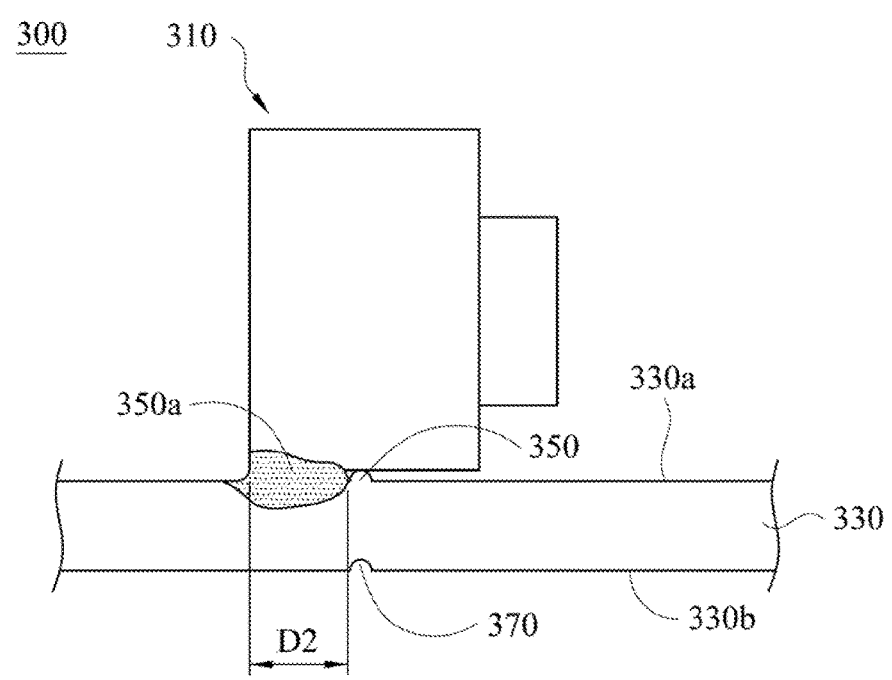
FIG. 6 is a schematic structural diagram showing a light source assembly in accordance with an embodiment of the present invention.

Referring to FIG. 3 and FIG. 6, FIG. 6 is a schematic structural diagram showing a light source assembly 300 in accordance with an embodiment of the present invention. The light source assembly 300 of the present embodiment is manufactured by the method 200. The light source assembly 300 includes the aforementioned light bar 310 and the back plate 330. The light bar 310 is fixed on the surface 330a of the back plate 330 via a welding layer 350a which is formed in step 204 shown in FIG. 3. In other words, when step 204 is performed, portions of the back, plate 330 and/or the substrate 312 in the weld-processing area 390 are melted in the welding process to form the welding layer 350a, thereby connecting the light bar 310 and the back plate 330. It is noted that the connecting portion 350 used to separate the light bar 310 from the back plate 330 does not completely melt in the welding process. Therefore, the aforementioned welding layer 350a is located adjacent to the connecting portion 350.

Referring to FIG. 3 and FIG. 6, in one embodiment, after the light bar 310 is welded on the back plate 330, a polishing tool can be used to polish the surface 330b of the back plate 330 to avoid the different height between the recess portion 370 and the surface 330b, thereby planarizing the surface 330b of the back plate 330.

It is noted that the function of the welding layer 350a is similar to that of welding layer 170 shown in FIG. 1, which is used to transfer heat generated by the light bar 310 to the ambience. Because the laser beam can be effectively used in the present invention and the energy and temperature of the laser welding are reduced, a depth D2 of the welding layer 350a can be increased without damaging the light bar 310, thereby improving the yield of the light source assembly 300.

According to the aforementioned embodiments of the present invention, a weld-processing area is formed to separate the back plate from the light bar. When the welding process is performed, the laser beam can be reflected back and forth between the back plate and the light bar to melt the light bar and the back plate in the weld-processing area rapidly, such that the melted materials can flow through and fill the weld-processing area to fix the light bar on the back plate. Accordingly, thermal energy of the laser beam can be effectively used to decrease the laser welding power and melt the connecting portions rapidly. In addition, the decreased laser welding power can prevent the light bar from being damaged during the welding process, and the back plate from having irregular warpages.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for manufacturing a light source assembly, the method comprising:
   providing a back plate and a light bar, wherein the light bar comprises a substrate and a plurality of light emitting diodes disposed on a mounting surface of the substrate;
   providing at least one protrusion on a surface of the back plate or a bottom surface of the substrate
   disposing the light bar on the protrusion so that the light bar is disposed inclinedly on the back plate to form an included angle which is smaller than 90 degrees between the substrate and the back plate, and forming a weld-processing area between the light bar and the back plate, wherein the weld-processing area comprises an air interface; and
   melting at least one of the light bar and the back plate through welding to form melted materials for filling the weld-processing area to fix the substrate on the back plate.

2. The method of claim 1, further comprising:
   forming a welding layer after the melted materials fill the weld-processing area, wherein the substrate is fixed on the back plate via the welding layer.

3. The method of claim 1, wherein the at least one protrusion is formed by stamping.

4. The method of claim 1, wherein the step of providing the at least one protrusion comprises simultaneously forming at least one recess portion on an opposite surface of the surface of the back plate or an opposite surface of the bottom surface of the substrate, and the at least one recess is corresponding to the at least one protrusion.

5. The method of claim 1, wherein the welding process comprises an operation of using a laser device to emit a laser beam to the weld-processing area, and the incident angle of the laser beam is in a range substantially from 12 degrees to 20 degrees.

6. The method of claim 1, wherein a height of the at least one protrusion is in a range substantially from 0.04 mm to 0.12 mm.

7. The method of claim 1, wherein the mounting surface of the substrate is vertical to a bottom surface of the substrate.

8. The method of claim 1, wherein, when viewed in a cross section of the light source assembly taken along a width direction of the substrate, the included angle is formed between a line drawn along a height direction of the substrate, and a line drawn along a length direction of the back plate which is perpendicular to the height direction of the substrate.

* * * * *